No. 702,896. Patented June 17, 1902.
C. H. WILLIAMS, Jr.
SIDE BEARING FOR RAILWAY CARS.
(Application filed Feb. 12, 1902.)
(No Model.)

Witnesses:
G. A. Pennington
Ralph M. Ashby

Inventor:
Chas. H. Williams, Jr.,
by Bakewell Cornwall
Attys.

THE NORRIS PETERS CO., PHOTO-LITHO., WASHINGTON, D. C.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

SIDE BEARING FOR RAILWAY-CARS.

SPECIFICATION forming part of Letters Patent No. 702,896, dated June 17, 1902.

Application filed February 12, 1902. Serial No. 93,799. (No model.)

*To all whom it may concern:*

Be it known that I, CHARLES H. WILLIAMS, Jr., a citizen of the United States, residing at Chicago, in the county of Cook and State of Illinois, have invented certain new and useful Improvements in Side Bearings for Railway-Cars, of which the following is a specification.

This invention relates to a new and useful improvement in side bearings for railway-cars, the object being to construct a device of the character described in such manner that the supports for the antifriction devices will be constantly lubricated, that the balls or antifriction devices which take the burden will themselves be supported by antifriction devices, and that the device as an entirety will be simple, cheap, and easy of assemblage and application.

With these objects in view the invention consists in the construction, arrangement, and combination of the several parts, all as will hereinafter be described and afterward pointed out in the claims.

Figure 1:
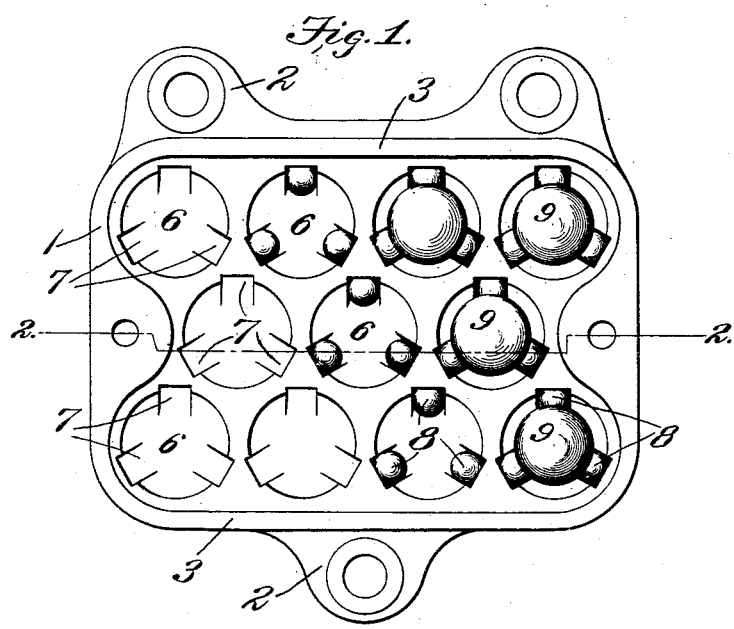
Figure 2:
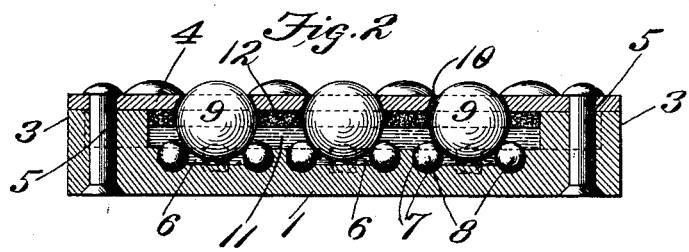

In the accompanying drawings, Figure 1 is a top plan view of the base-casting, showing the seats for the supporting antifriction devices, said antifriction devices being present in some of said seats, while said antifriction devices at one end of the casting carry the burden-supporting walls; and Fig. 2 is a vertical sectional view on line 2 2 of Fig. 1.

1 indicates a casting having the usual perforated lugs or ears 2, whereby the device may be secured in position on the truck-bolster or other support. This casting is provided with a marginal flange or walls 3, upon which walls is arranged a cover-plate 4, held in position by suitable rivets 5. The bottom wall of this casting within the walls 3 is provided with a series of pockets or recesses 6, whose side edges are undercut, as at 7, for the purpose of providing stalls or seats for antifriction devices 8, preferably in the form of balls. These antifriction devices may be in the form of rollers, whose axis of rotation would preferably be radial and incline downwardly. In any event these antifriction devices are arranged around the recesses 6, preferably three or more in number and equidistantly apart.

9 indicates burden-carrying balls, which are supported by the antifriction devices 8, which hold said burden-carrying balls above the bottoms of the recesses 6. These antifriction devices 8 provide points of support for the burden-carrying balls, which supporting-points are so located as to tend to prevent the lateral displacement of the burden-carrying balls in any direction. The burden-carrying balls, as shown in Fig. 2, extend through appropriately-shaped openings in the cover-plate for obvious reasons. These openings (indicated at 10) are of such size as to permit the burden-carrying balls to turn in their bearings without becoming bound.

In order to lubricate the antifriction devices 8 and also the balls 9, I introduce a lubricant 11 into the casting, as shown in Fig. 2. This lubricant is liquid or semiliquid and is of such depth that it will submerge the antifriction devices 8, as well as lubricate the balls 9.

To prevent the lubricant from escaping through the openings 10, I arrange a felt lining 12 on the inside of the plate 4, said lining having openings registering with the openings 10; but instead of permitting free rotation of the balls 9 without contact this lining 12 preferably contacts with the balls 9 at all points.

A side bearing constructed as above described is designed to be applied in position on the truck-bolster of a car in the usual way for coöperation with the bearing member, which is arranged on the transom of the car-body. The burden-carrying balls 9, protruding through the plate 4, will receive the top member of the side bearing, (on the body-transom,) and said burden-carrying balls, while in the nature of antifriction devices themselves, are supported by antifriction devices interposed therebetween and the casting. By arranging a yielding wiping-pad, such as the lining 12, dirt, dust, &c., are excluded from the interior of the casting and the lubricant is retained in the casting or chamber containing the antifriction devices for the burden-carrying balls.

I am aware that many minor changes may be made in the construction and arrangement of the several parts of my device without in the least departing from the nature and principle of my invention.

Having thus described my invention, what I claim, and desire to secure by Letters Patent of the United States, is—

1. In a side bearing for railway-cars, the combination with burden-carrying balls, of antifriction devices under said balls for supporting the same, said antifriction devices being arranged to the side of the vertical axes of said balls, and a support having recesses in which recesses are located said antifriction devices; substantially as described.

2. In a side bearing for railway-cars, the combination with a casting having recesses, of antifriction devices arranged around the side walls of said recesses, and burden-carrying devices supported by said antifriction devices; substantially as described.

3. In a side bearing for railway-cars, the combination with a support having recesses, said recesses having undercut stalls in their side walls, antifriction devices in said stalls, and burden-carrying balls; substantially as described.

4. In a side bearing for railway-cars, the combination with a casting having marginal flanges, of antifriction devices submerged in a lubricant, burden-carrying balls supported at different points by said antifriction devices, and means for holding said balls in position; substantially as described.

In testimony whereof I hereunto set my hand, in the presence of two witnesses, this 31st day of January, 1902.

CHARLES H. WILLIAMS, Jr.

Witnesses:
E. T. WALKER,
E. B. LEIGH.